US008327808B2

(12) United States Patent
Chirico

(10) Patent No.: US 8,327,808 B2
(45) Date of Patent: Dec. 11, 2012

(54) UNIVERSAL DOG LEASH

(76) Inventor: John Chirico, Daly City, CA (US)

( * ) Notice: Subject to any disclaimer, the term of this patent is extended or adjusted under 35 U.S.C. 154(b) by 0 days.

(21) Appl. No.: 13/026,067

(22) Filed: Feb. 11, 2011

(65) Prior Publication Data
US 2012/0204813 A1 Aug. 16, 2012

(51) Int. Cl.
*A01K 27/00* (2006.01)
(52) U.S. Cl. ....................................... 119/792
(58) Field of Classification Search ........... 119/792, 119/797, 798, 795; *A01K 27/00*
See application file for complete search history.

(56) References Cited

U.S. PATENT DOCUMENTS

| | | | | |
|---|---|---|---|---|
| 153,724 A | * | 8/1874 | Schmidt | 54/34 |
| 2,737,154 A | * | 3/1956 | Michonski | 119/798 |
| 2,861,547 A | | 8/1957 | Dale | |
| 2,827,017 A | * | 3/1958 | Ryan | 119/795 |
| 3,752,127 A | * | 8/1973 | Baker | 119/797 |
| 4,763,609 A | | 8/1988 | Kulik | |
| 4,892,063 A | * | 1/1990 | Garrigan | 119/795 |
| D343,032 S | * | 1/1994 | Carrero | D30/151 |
| 5,351,654 A | * | 10/1994 | Fuentes | 119/770 |
| D359,599 S | * | 6/1995 | Archambault | D30/153 |
| 5,517,949 A | * | 5/1996 | Harris et al. | 119/795 |
| 5,551,379 A | * | 9/1996 | Hart | 119/771 |
| 5,551,380 A | * | 9/1996 | Hodgson | 119/795 |
| D375,587 S | | 11/1996 | Maglich | |
| 5,632,234 A | * | 5/1997 | Parker | 119/795 |
| 5,649,504 A | * | 7/1997 | Culp | 119/795 |
| D382,379 S | * | 8/1997 | Smith | D30/153 |
| 5,701,848 A | * | 12/1997 | Tozawa | 119/797 |
| 5,709,172 A | | 1/1998 | Maglich | |
| 5,718,189 A | * | 2/1998 | Blake | 119/770 |
| 5,842,444 A | * | 12/1998 | Perrulli | 119/770 |
| D408,103 S | | 4/1999 | Snedeker | |
| 6,029,611 A | * | 2/2000 | Hershauer | 119/771 |
| 6,439,168 B1 | * | 8/2002 | Maglich et al. | 119/795 |
| 6,662,753 B1 | | 12/2003 | Sporn | |
| 6,675,742 B1 | | 1/2004 | Shiraki | |
| 6,851,393 B2 | * | 2/2005 | Bremm | 119/770 |
| 6,971,334 B1 | | 12/2005 | Livesay | |
| 6,990,929 B2 | * | 1/2006 | Young, III | 119/798 |
| 7,096,827 B2 | * | 8/2006 | Sporn | 119/797 |
| 7,243,615 B1 | * | 7/2007 | Hendrie | 119/792 |
| 7,726,261 B2 | * | 6/2010 | Everhart | 119/795 |
| 7,938,086 B2 | * | 5/2011 | Cobb et al. | 119/770 |
| D654,231 S | * | 2/2012 | Clayton | D30/153 |
| 2004/0112303 A1 | * | 6/2004 | Moulton, III | 119/795 |
| 2010/0050956 A1 | * | 3/2010 | Pellei | 119/770 |

* cited by examiner

*Primary Examiner* — Richard Price, Jr.
(74) *Attorney, Agent, or Firm* — Global Intellectual Property Agency, LLC

(57) ABSTRACT

A dog leash that is capable of serving a multitude of purposes. The dog leash is made of resilient material, allowing it to stretch, which decreases the stress on both the user and the dog. The leash can be configured to lead one dog or two dogs at the same time. The leash can be used as a hands free lead, worn around the user's waist or shoulder. When worn around the waist, it allows 360 degrees of movement by the dog. The lead is also capable of being used as a seat restraint in a motor vehicle or as a tether. The leash is readily adjustable, suited for all size dogs, and can be especially useful for service dogs.

5 Claims, 5 Drawing Sheets

UNIVERSAL DOG LEASH

CROSS REFERENCE TO RELATED APPLICATION

None.

BACKGROUND OF THE INVENTION

1. Field of the Invention

The present invention relates to an improved multipurpose dog leash.

2. Description of the Prior Art

A number of dog leashes are known in the prior art. These include leashes made of a stretchable, resilient material, such as those shown in U.S. Pat. No. 6,971,334 issued to Livesay and U.S. Pat. No. D408,103 issued to Snedeker. Other leashes claim to be readily adjustable or multifunctional. Examples of these include U.S. Pat. No. 6,662,753 issued to Sporn, U.S. Pat. No. 4,763,609 issued to Kulik, U.S. Pat. No. 2,861,547 issued to Dale, U.S. Pat. No. D375,587 issued to Maglich, U.S. Pat. No. 5,709,172 issued to Maglich and U.S. Pat. No. 6,675,742 issued to Shiraki. While each of these prior art leashes brings its own unique benefit, none offer the versatility and multitude of uses that the present leash offers. Specifically, no known prior art provides a unique two half leash with fixed and movable rings that allow it to be used for a variety of different purposes.

SUMMARY OF THE INVENTION

In view of the foregoing advantages and disadvantages inherent in the known types of dog leashes now present in the prior art, the present invention provides a new dog leash wherein the same can be utilized for providing convenience for the user when leading or restraining a dog.

It is therefore an object of the present invention to provide a dog leash that is capable of performing multiple functions, including use as a standard lead.

Another object is to provide a dog leash that can be used as a hands free lead.

Another object is to provide a dog leash that can be used as a double lead.

Another object is to provide a dog leash that can be used as a restraint in a motor vehicle.

Another object is to provide a dog leash that can be used as a tie down or tether.

Yet another object is to provide a dog leash that is made of a resilient material, so as to minimize stress on both the user and the dog.

Other objects, features and advantages of the present invention will become apparent from the following detailed description taken in conjunction with the accompanying drawings.

BRIEF DESCRIPTIONS OF THE DRAWINGS

DETAILED DESCRIPTION OF THE INVENTION

Figure 1:
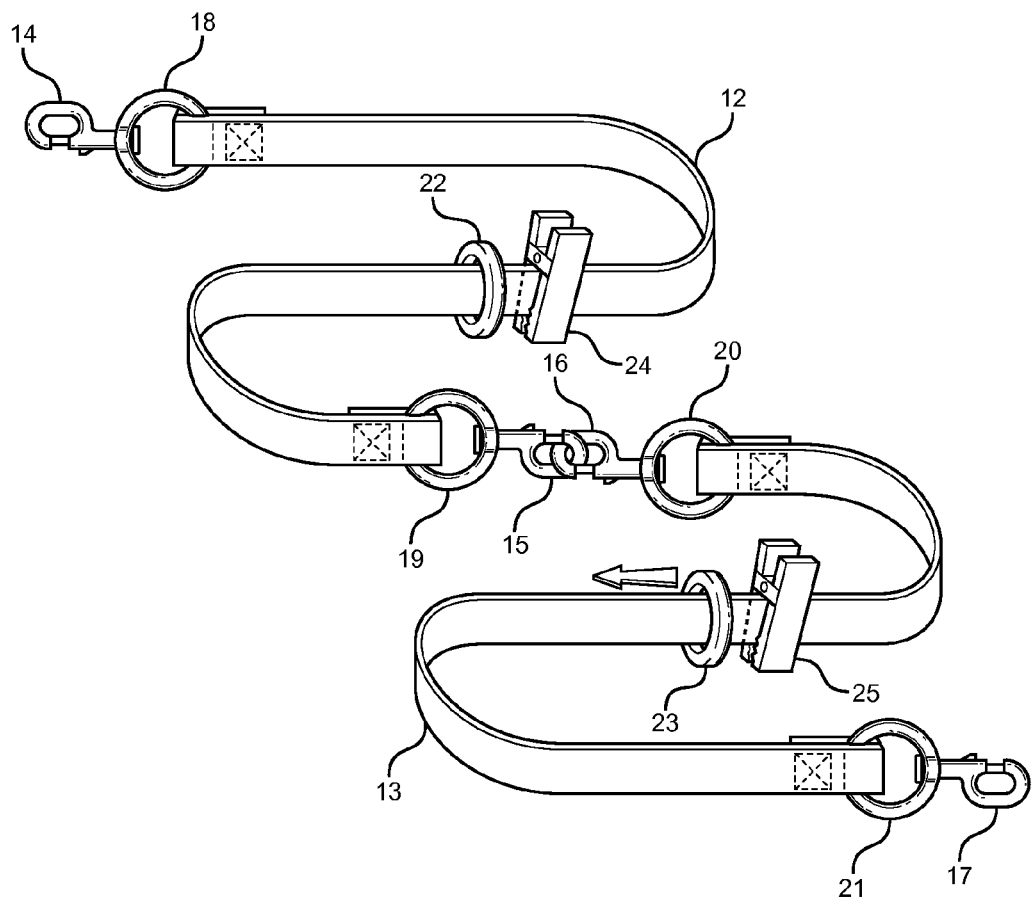
FIG. 1 Shows the leash in its standard configuration for leading a single dog.

Referring now to FIG. 1, there is shown the leash alone. The leash is separable into a first half 12 and a second half 13. Each half is identical design and function, varying only in length if necessary or desired. At each end of the leash halves 12, 13 are snaps 14, 15, 16, 17 that can be opened and closed with the thumb. Each snap is attached to a fixed circular ring 18, 19, 20, 21, which is attached to the leash. A movable circular ring 22, 23 is present on each leash half, and is capable of sliding the length of the leash. The fixed circular rings have an outer diameter greater than the inner diameter of the movable circular rings, so as to act as stops at the ends of the leash. Removable clamps 24, 25 can be used as a stop for the movable rings at any point on the leash.

The configuration shown in FIG. 1 can be used for leading a single dog. Each half of the leash is joined, by attaching the second 15 and third 16 clamps, to form a single leash. The first snap 14 on the first half 12 can be attached to the second fixed ring 19 or the first movable ring 22 to form a loop, which will be the handle for the user to grasp when leading a dog. The removable clamp 24 can be placed in between the first snap 14 and first movable ring 22 to create a minimum handle size. The opposite can be done to form a maximum handle size. The same can be done with the second half, which will act as a collar for the dog. Alternatively, the fourth snap 17 on the second half 13 can be attached to a separate collar worn by the dog. The first half 12 of the leash can also be secured around a fixed object, such as a tree or pole, to tether a dog in place.

The leash is formed of a resilient material, which reduces stress on both the user and the dog. The material can be a durable rubber, for example. The elasticity of the rubber can be determined based on the dog's size and aggressiveness.

Figure 2:
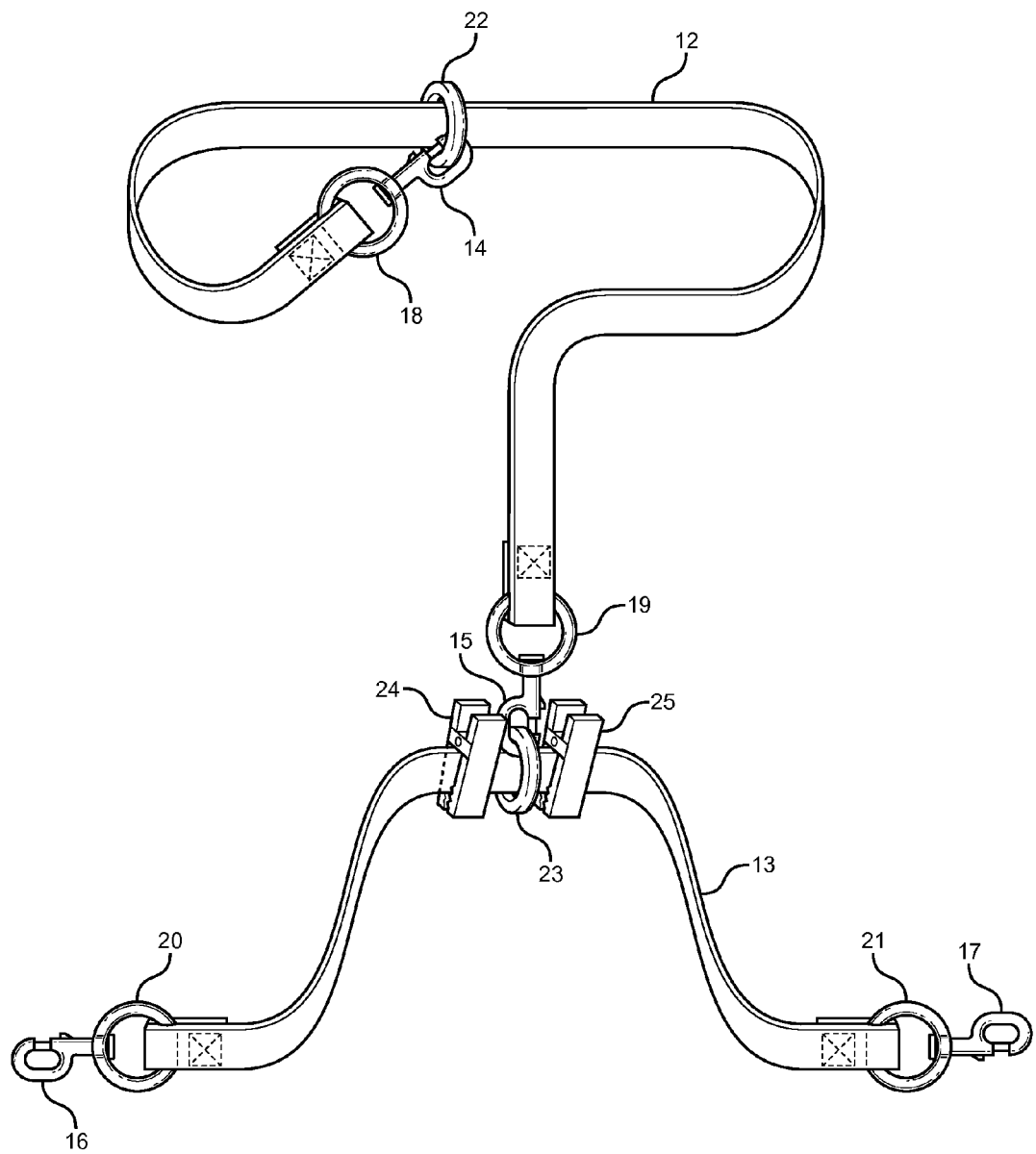
FIG. 2 Shows the leash in a configuration to lead two dogs.

Referring now to FIG. 2, there is shown the dog leash in a configuration for leading two dogs at once. In this configuration, the second snap 15 on the first half 12 of the leash is attached to the second movable ring 23 on the second half 13. Removable clamps 24, 25 can be placed on each side of the movable ring to set the lead length for each dog. The same handle can be formed for the user as with the single dog configuration. Each snap 16, 17 on the second half 13 can be attached to a dog's collar to simultaneously lead two dogs.

Figure 3:
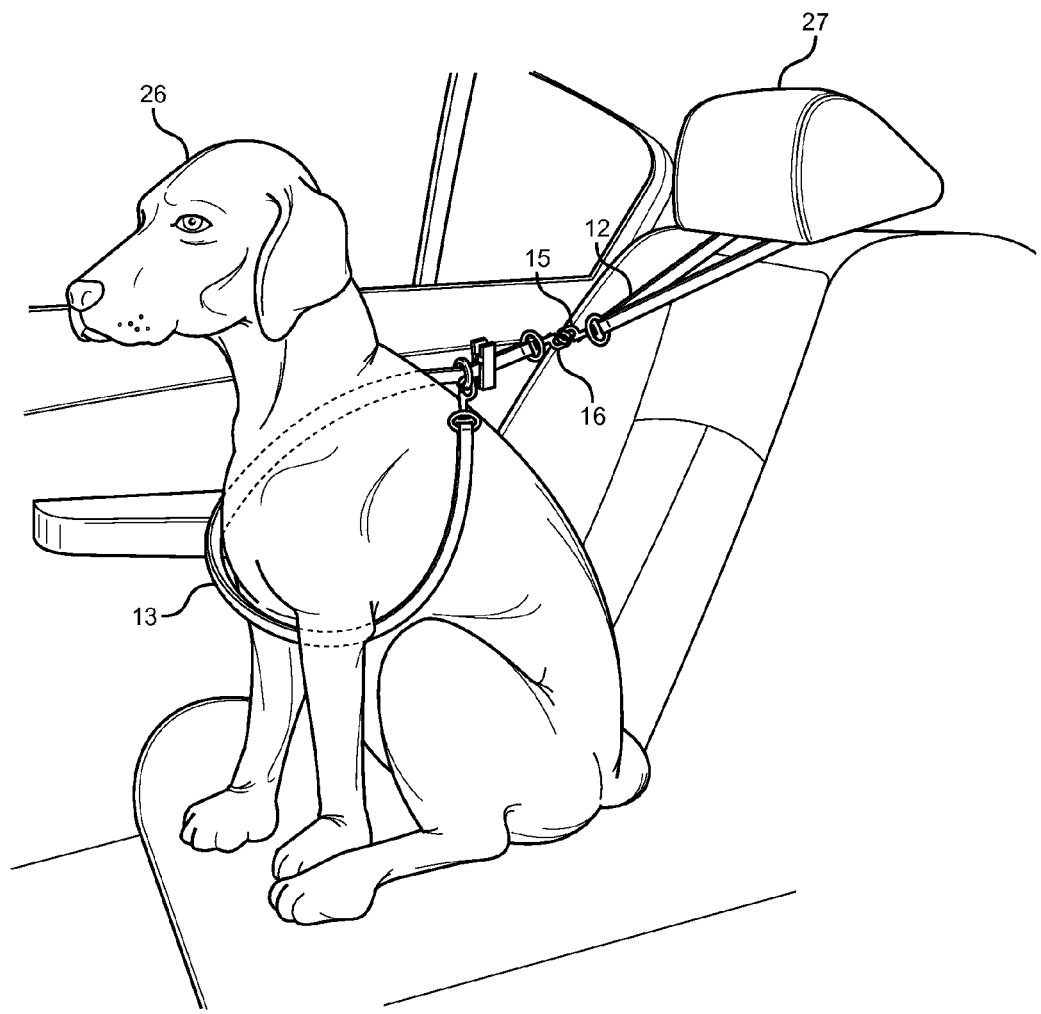
FIG. 3 Shows the leash in a configuration for securing a dog to a vehicle seat.

Referring now to FIG. 3, there is shown a leash configuration for securing a dog in a vehicle seat. The first half 12 of the leash is formed in a closed circle and wrapped around the headrest 27 of a vehicle seat. The second snap 15 on the first half 12 attached to the third snap 16 on the second half 13. The second half 13 is wrapped around the dog's 26 chest, passing under one leg and over the other. The fourth snap on the second half is then secured to the movable or fixed ring. If the movable ring is used, the removable clamp may be attached, which will set a maximum or minimum distance that the dog can move.

Figure 4:
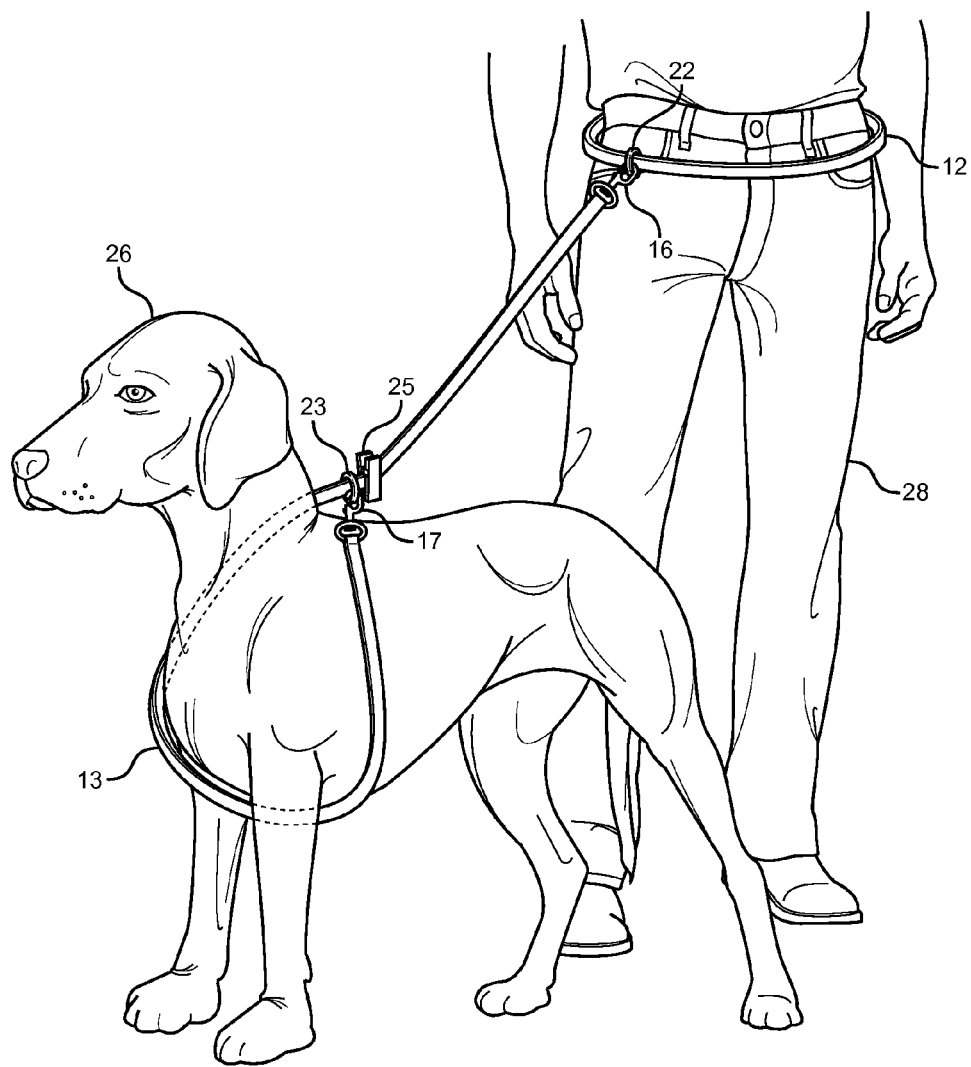
FIG. 4 Shows the leash in a hands free configuration, worn around the waist of the user.

Referring now to FIG. 4, there is shown a leash configuration for allowing hands free use while leading a dog 26. The first half of the leash 12 is wrapped around the user's 28 waist and the first and second snaps are connected to form a belt type configuration. The elasticity of the leash allows it to fit various size waists. The second half 13 of the leash is attached to the dog 26 in the same manner as when used for a seat belt. Alternatively, the leash can be attached around the dog's neck and used as a slip collar, or it can be attached directly to a separate collar. The third snap 16 on the second half 13 is attached to the first movable ring 22 on the first half 12. In this configuration, the dog 26 has 360 degreed of movement around the user 28.

Figure 5:
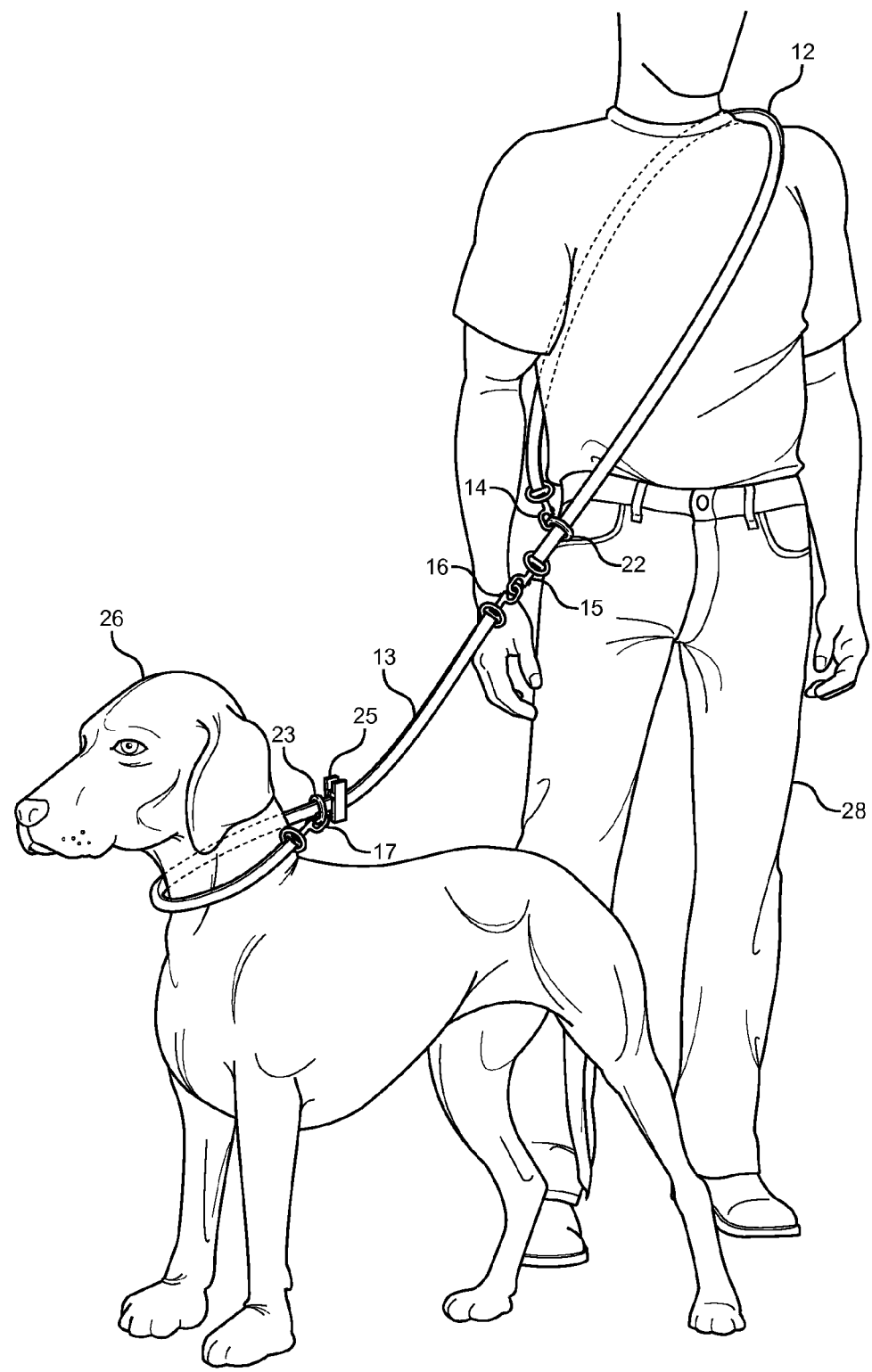
FIG. 5 Shows the leash in an alternate hands free configuration, worn around the shoulder of the user.

Referring now to FIG. 5, there is shown a leash configuration for allowing an alternate method of hands free use while leading a dog 26. The first half 12 of the leash is worn around a user's 28 shoulder. The first snap 14 is attached to the first slidable ring 22, wherein a removable clamp can be attached to fix the maximum or minimum size of the loop. Alternatively, the first snap 14 can be connected to the second fixed ring 19 to form a fixed loop around the user 28. As with the hands free waist configuration, the second half 13 can be attached around the dog's chest, passing under one leg, or it can be used as a slip collar or attached to a separate collar. When used as a slip collar, the removable clamp 25 can be used to fix the maximum or minimum size of the loop around the dog's neck or chest. The shoulder configuration shown is particularly useful for service dogs. The loop around the user 28 will apply pressure on different areas of the back, shoulder, and chest depending on the direction the dog 26 is leading the user.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A multipurpose dog leash comprising:
    two identical halves having a length made of resilient material, wherein each half has a first and second end; each first and second end having a fixed circular ring attached thereto and a snap attached to each of said fixed circular rings; a movable ring on each half of said leash, wherein said movable rings are capable of sliding without obstruction along the entirety of said length of said halves; a plurality of removable clamps capable of being removably attached on any part of said length of said leash halves for fixing a position of said movable rings.

2. The multipurpose leash of claim 1, wherein said first half forms a loop by connecting said snap on said first end to said movable ring, fixed ring, or snap on said second end, wherein said loop can be used as a handle, hands free waist support, handsfree shoulder support, or attachment to a vehicle seat; one of said removable clamps being attached to said first half to fix a maximum or minimum size of said loop.

3. The multipurpose leash of claim 2, wherein said movable ring on said first half or said snap on said second end of said first half of said leash is attached to said snap on said first end of said second half of said leash; said second end of said second half being attached to a dog by forming a loop to encircle said dog's neck or chest and to act as a slip collar, wherein said loop is formed from said second half by connecting said snap on said second end to said movable ring, fixed ring, or snap on said second end; one of said removable clamps being attached to said first half to fix a maximum or minimum size of said loop.

4. The multipurpose leash of claim 2, wherein said movable ring on said first half of said snap on said second end of said first half of said leash is attached to said snap on said first end of said second half of said leash; said second end of said second half being attached to a dog by connecting said snap on said second end to a separate collar worn by said dog.

5. The multipurpose leash of claim 2, wherein said snap on said second end of said first half of said leash is attached to said movable ring on said second half of said leash, wherein at least one of said removable clamps is attached to said second half of said leash to fix a position of said movable ring, wherein each of said snaps on said first and second ends of said second halves are attached to a dog's collar for leading two dogs at once.

* * * * *